(12) United States Patent
Kimura et al.

(10) Patent No.: US 7,751,174 B2
(45) Date of Patent: Jul. 6, 2010

(54) ELECTRONIC PART WITH EXTERNAL ELECTRODE

(75) Inventors: Takeshi Kimura, Sapporo (JP); Yamato Takada, Eniwa (JP); Michinori Komagata, Niigata (JP); Masahiro Kitamura, Niigata (JP); Kiminori Yokoyama, Niigata (JP)

(73) Assignees: Matsushita Electric Industrial Co., Ltd., Osaka (JP); Namics Corporation, Niigata (JP)

( * ) Notice: Subject to any disclaimer, the term of this patent is extended or adjusted under 35 U.S.C. 154(b) by 1076 days.

(21) Appl. No.: 10/538,136

(22) PCT Filed: Dec. 9, 2003

(86) PCT No.: PCT/JP03/15745

§ 371 (c)(1),
(2), (4) Date: Jun. 9, 2005

(87) PCT Pub. No.: WO2004/053901

PCT Pub. Date: Jun. 24, 2004

(65) Prior Publication Data

US 2006/0044098 A1   Mar. 2, 2006

(30) Foreign Application Priority Data

Dec. 9, 2002   (JP) ............................. 2002-356545

(51) Int. Cl.
*H01G 4/228* (2006.01)
*H01G 2/20* (2006.01)
*H01B 1/00* (2006.01)
*H01B 1/12* (2006.01)

(52) U.S. Cl. .................. 361/306.3; 361/308.1; 252/500

(58) Field of Classification Search ............. 361/306.3, 361/308.1; 252/500
See application file for complete search history.

(56) References Cited

U.S. PATENT DOCUMENTS

| 4,233,103 | A | * | 11/1980 | Shaheen | .................. | 156/331.8 |
|---|---|---|---|---|---|---|
| 4,400,214 | A | * | 8/1983 | Ogawa et al. | ............. | 106/1.13 |
| 5,128,827 | A | * | 7/1992 | Yokotani et al. | ............ | 361/309 |
| 5,335,139 | A | * | 8/1994 | Nomura et al. | .......... | 361/321.4 |
| 5,376,403 | A |   | 12/1994 | Capote et al. | | |
| 5,426,560 | A | * | 6/1995 | Amaya et al. | ............... | 361/309 |
| 5,463,190 | A | * | 10/1995 | Carson et al. | .............. | 174/259 |
| 5,853,622 | A | * | 12/1998 | Gallagher et al. | ........... | 252/512 |
| 2002/0043652 | A1 | * | 4/2002 | Takezawa et al. | ........... | 252/500 |
| 2002/0064638 | A1 | * | 5/2002 | Araki et al. | ................. | 428/206 |
| 2002/0079135 | A1 | * | 6/2002 | Yazaki et al. | ............... | 174/264 |
| 2002/0114726 | A1 | * | 8/2002 | Soga et al. | .................. | 420/557 |

FOREIGN PATENT DOCUMENTS

| JP | 54022596 | * | 2/1979 |
|---|---|---|---|
| JP | 56-101739 | A | 8/1981 |
| JP | 06-267784 | A | 9/1994 |
| JP | 7-282622 | A | 10/1995 |
| JP | 8-064469 | A | 8/1996 |
| JP | A-10-022170 | | 1/1998 |
| JP | A-10-279903 | | 1/1998 |
| JP | 10-154633 | A | 6/1998 |
| JP | 10-172346 | A | 6/1998 |
| JP | 10172346 | A * | 6/1998 |
| JP | 10-321460 | A | 12/1998 |
| JP | 11-54358 | A | 2/1999 |
| JP | 2000-188228 | | 7/2000 |
| JP | 2002-100525 | | 4/2002 |
| JP | 2002-246258 | A | 8/2002 |
| WO | WO 9808362 | A1 * | 2/1998 |

OTHER PUBLICATIONS

Machine Translation of JP10172346.*
Derwent absract of JP54022596.*

* cited by examiner

*Primary Examiner*—Eric Thomas
*Assistant Examiner*—David M Sinclair
(74) *Attorney, Agent, or Firm*—Frishauf, Holtz, Goodman & Chick, P.C.

(57) ABSTRACT

The present invention is intended to solve the problem of a conventional thermosetting conductive paste with respect to bonding-property between an internal electrode(s) and an external electrode(s) so as to provide a multilayer ceramic electronic part suitable for its mounting on a substrate and for its plating-treatment. The present invention relates to a multilayer ceramic electronic part, characterized in that it has an external electrode(s) formed from a thermosetting conductive paste comprising conductive particles having a high melting point, metal powder having a melting point of 300° C. or less and a resin(s).

9 Claims, 1 Drawing Sheet

PRIOR ART

US 7,751,174 B2

ELECTRONIC PART WITH EXTERNAL ELECTRODE

This application is the United States national phase application of International Application PCT/JP2003/015745 filed Dec. 9, 2003.

TECHNICAL FIELD

The present invention relates to a multilayer ceramic electronic part, in particular to a highly reliable multilayer ceramic electronic part such as a multilayer ceramic capacitor, which is suitable for its mounting on a substrate or for its plating treatment.

BACKGROUND ART

A multilayer ceramic capacitor which is one example of multilayer ceramic electronic parts is illustrated in FIG. 1, wherein an external electrode (4) formed on a surface where an internal electrode(s) of a ceramic composite body of the multilayer ceramic capacitor (1) is led out is generally formed by using a fired-type conductive paste or a thermosetting conductive paste according to a method as described below, wherein the ceramic composite body comprises a ceramic dielectric(s) (2) and the internal electrode(s) (3), as alternately layered.

The first method is the one for forming an external electrode (4) by applying a fired-type conductive paste to a surface where an internal electrode(s) (3) of a multilayer ceramic composite body is led out, wherein the fired-type conductive paste is prepared by blending conductive particles such as silver or copper powder and glass frit into a vehicle; and drying the same; and thereafter firing the same in an atmosphere of inert gas such as nitrogen gas, at an elevated temperature between 500 to 900° C.

The second method is the one for forming an external electrode (4) by applying a thermosetting conductive paste to a surface where an internal electrode(s) (3) of a multilayer ceramic composite body is led out, wherein the thermosetting conductive paste is prepared by blending conductive particles such as Ag powder into a thermosetting resin; and thereafter thermosetting the same at a low temperature between 150 to 250° C. [See, for example, JPA-(Japanese Patent KOKAI (Laid-Open) No.) Hei 6(1994)-267784].

The third method is the one for forming an external electrode (4) by applying a thermosetting conductive paste to a surface where an internal-electrode(s) (3) of a multilayer ceramic composite body is led out, wherein the thermosetting conductive paste is prepared by blending a pyrolytic organometallic material(s) such as silver acetate and conductive particles such as Ag powder into a thermosetting resin; and thereafter thermosetting the same at a temperature of 350° C. (See, for example, JPA-2000-182883).

In any method, in order to enhance the bonding strength when the capacitor element obtained is mounted on a substrate or the like with solder, if necessary, a plating-treated layer (5) may be formed upon the surface of the electrode layer. For example, the surface of an external electrode may be electroplated with nickel in a Watt bath or the like, and thereafter further may be electroplated with solder and/or tin.

However, a capacitor having an external electrode(s) obtained by the first method above has, for example, the problem of poor plating-adhesion due to the floating of glass, because of the diffusion of the glass-frit component in the conductive paste into the inside of a capacitor element when the capacitor is fired at an elevated temperature, and the problem of the occurrence of cracks when the capacitor is mounted with solder on a substrate. Furthermore, it has problems concerning the reliability of capacitor performance. For example, due to the infiltration of a plating solution into a sintered body in the plating-treatment, the electric capacitance is lower than a designed value, and/or the insulation resistance is deteriorated.

On the other hand, a capacitor having an external electrode(s) obtained by the second method above, wherein the thermosetting conductive paste is used and thermally set at the low temperature, can solve the problems at the time of its mounting on the substrate or of its plating-treatment as described above. However, because of its low curing temperature, the metal-to-metal solid-phase diffusion of the conductive particles (such as silver powder) in the conductive paste into the internal electrode(s) can not progress, and thus the junction of the internal electrode(s) with the external electrode(s) is poor, thereby its designed electrical properties such as electric capacity can not be obtained, and thus the resultant capacitor is poor in the reliabilities.

Furthermore, a capacitor having an external electrode(s) formed by the third method, wherein the thermosetting conductive paste containing the pyrolytic organometallic material(s) is used, has such problems as the insulation deterioration for its moisture-resistible duration of life and the pot life of the paste is shortened, due to silver acetate and amine added to the paste.

It is an object of the present invention to solve the above-mentioned problems which the prior art has had in the formation of an external electrode and the sequential plating-treatment. That is, it is the object of the present invention to solve the problems concerning bonding-property between an internal electrode(s) and the external electrode, which the above-mentioned thermosetting conductive paste has had, and to provide a multilayer ceramic electronic part having high reliabilities which is suitable for its mounting on a substrate and for its plating-treatment.

DISCLOSURE OF THE INVENTION

The present invention relates to a multilayer ceramic electronic part having an external electrode(s) formed from a thermosetting conductive paste comprising conductive particles having a high melting point, metal powder having a melting point of 300° C. or less, and a resin(s).

The present invention is based on facts which have been found that a multilayer ceramic electronic part which is excellent in bonding-property between an internal electrode(s) and an external electrode(s) and suitable for its mounting on a substrate and for the plating-treatment can be obtained by using a metal powder having a melting point of 300° C. or less together in addition to conventional conductive particles having a high melting point for a thermosetting conductive paste which forms an external electrode(s).

The present invention also relates to a multilayer ceramic electronic part obtained according to a method comprising the steps of: (1) providing a thermosetting conductive paste comprising an conductive particles having a high melting point, metal powder having a melting point of 300° C. or less and a resin(s), and a ceramic composite body which is to be provided with an external electrode(s); (2) printing or applying said thermosetting conductive paste on or to a surface(s) where an internal electrode(s) of said ceramic composite body is led out; and (3) maintaining said ceramic composite body obtained in the step (2) at a temperature range of 80° C. to 400° C. for a period of one to sixty minutes so as to form the external electrode(s).

The thermosetting conductive paste comprises metal powder having a melting point of 300° C. or less in addition to conventional conductive particles having a high melting point, and thus the solid-phase diffusion of the conductive particles in the conductive paste into internal electrode metal can progress even at a low curing temperature of about 80° C. to 400° C., thereby excellent bonding-property between the internal electrode(s) and the external electrode(s) can be obtained.

BEST MODE FOR CARRYING OUT THE INVENTION

Figure 1:
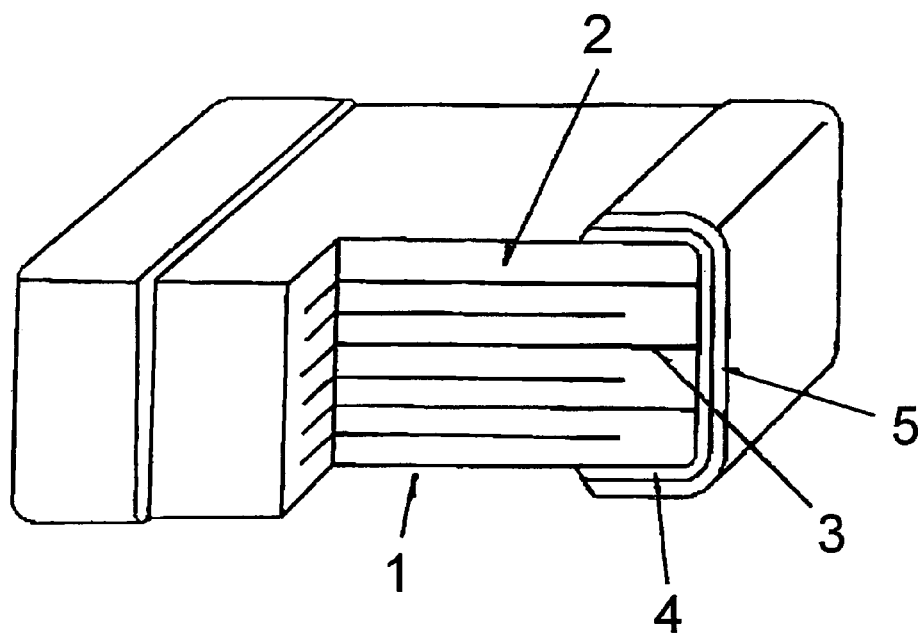
FIG. 1 is a schematic drawing of a multilayer ceramic capacitor which is one example of multilayer ceramic electronic parts.

A multilayer ceramic electronic part of the present invention is characterized by having an external electrode(s) formed from a thermosetting conductive paste comprising conductive particles having a high melting point, metal powder having a melting point of 300° C. or less and a resin(s). To the thermosetting conductive paste used in the present invention, if necessary, a curing catalyst, a curing agent and/or an organic solvent and the like can be further added.

As the conductive particles having a high melting point, metal powder having a high melting point such as Ag, Cu, Ni, Zn, Al, Pd, Au or Pt powder or their alloy powder can be mentioned. The metal powder may be used alone or in combination with other one or more. Further, the term "metal powder having a high melting point" used herein means the one having a melting point of 400° C. or more, in particular preferably 600° C. or more. Among these conductive particles having a high melting point, the metal powder selected from Cu, Ni, Ag powder or an Ag alloy powder is preferred, and the metal powder selected from Ag powder or an Ag alloy powder is particularly preferred, because the excellent conductivity can be relatively easily obtained therefrom. As the Ag alloy, an AgCu, AgAu, AgPd or AgNi alloy and the like containing Ag as a primary ingredient can be mentioned.

As the metal powder having a melting point of 300° C. or less, Sn, SnZn, SnAg, SnCu, SnAl, SnPb, In, InAg, InZn, InSn, Bi, BiAg, BiNi, BiSn, BiZn or BiPb powder can be mentioned. The metal powder may be used alone or in combination with other one or more. From the viewpoint of the bonding-property between the internal electrode and the external electrode, the metal powder of Sn or an Sn alloy is preferred.

The shape of each of the conductive particles having a high melting point and the metal powder having a melting point of 300° C. or less may be any shape such as a spherical, scaly or needle shape. The average particle size of the metal powder is preferably 0.05 to 30 μm, and more preferably 0.1 to 20 μm, because it provides an excellent surface condition after printing or applying the paste containing them, and further provides excellent electric conductivities for the formed electrode. Further, the term "the average particle size" used herein means the average of particle sizes when the shape of the metal powder is spherical, the average of longer axes of scaly leaves when scaly, and the average of lengths of needles when needle.

The total content of the conductive particles having a high melting point and the metal powder having a melting point of 300° C. or less in the thermosetting conductive paste is preferably in the range of 60 to 98% by weight, and more preferably in the range of 70 to 95% by weight relative to the total weight of the conductive particles having a high melting point, the metal powder having a melting point of 300° C. or less, and the resin(s), because the thermosetting conductive paste shows excellent printabilities, and the resultant electrode layer(s) shows excellent electric conductivities. Furthermore, the content of the metal powder having a melting point of 300° C. or less is preferably in the range of 0.1 to 20% by weight, more preferably in the range of 1 to 20% by weight, and in particular still more preferably in the range of 5 to 20% by weight relative to the total weight of the conductive particles having a high melting point and the metal powder having a melting point of 300° C. or less.

A resin(s) used in the thermosetting conductive paste, which functions as a binder, includes a thermosetting resin(s). As the thermosetting resin(s), an amino resin such as urea resin, melamine resin or guanamine resin; an epoxy resin such as bisphenol A-type, bisphenol F-type, phenol novolac-type or cycloaliphatic epoxy resin; oxetane resin; a phenol resin such as resole-type or novolac-type phenol resin; and a silicone-modified organic resin such as silicone epoxy or silicone polyester resin are preferred. Such a resin may be used alone or in combination with other one or more. Furthermore, a thermoplastic resin(s) may be used together with such a thermosetting resin(s). As the thermoplastic resin, polysulfone, polyether sulfone, and maleimide resins and the like are preferred.

When a resin(s) which is liquid at an ambient temperature is used as the resin(s), the amount of an organic solvent as a diluent can be decreased, and thus it is preferred to use such a resin(s). As such a liquid resin, a liquid epoxy resin, a liquid phenol resin, and the like can be exemplified. Besides, a resin(s), which is compatible with the liquid resin(s) and is solid or very highly viscous at an ambient temperature, may be further added to the liquid resin and mixed therewith as long as the mixture system presents fluidity. As such a resin, an epoxy resin such as high-molecular-weight bisphenol A-type, diglycidylbiphenyl, novolac or tetrabromobisphenol A-type epoxy resin; resol-phenol resin, novolac-phenol resin, and the like can be exemplified.

When such an epoxy resin(s) is used, from the viewpoint of a curing mechanism, a self-curing resin(s) may be used, or a curing agent(s) or a curing catalyst(s) such as amines, imidazoles, acid anhydrides or onium salts may be used, or otherwise amino resins or phenol resins may function as a curing agent for the epoxy resin.

As the epoxy resin(s) used in the thermosetting conductive paste, the resin(s) cured with phenol resin is preferred. The phenol resin may be an initial condensate of phenol resin which is commonly used as a curing agent for epoxy resin, or may be a resol-type or novolac-type phenol resin. However, in order to alleviate a stress at the time of curing and to obtain good heat-cycle resistance, a phenol resin 50% by weight or more of which is an alkyl resol type or alkyl novolac type phenol resin is preferred. Furthermore, in case of alkyl novolac type phenol resin, in order to obtain excellent printabilities, the average molecular weight is preferably 2,000 or more. In the alkyl resol type or alkyl novolac type phenol resin, as the alkyl group, the one having 1 to 18 carbon atoms can be used, and the one having 2 to 10 carbon atoms, such as ethyl, propyl, butyl, pentyl, hexyl, octyl, nonyl or decyl, is preferred.

Among them, a bisphenol-type epoxy resin and a resol-type phenol resin are preferred because they are excellent in adhesive properties and heat resisting properties, and in particular, the combination of a bisphenol-type epoxy resin and a resol-type phenol resin is preferred. When the combination of a bisphenol-type epoxy resin and a resol-type phenol resin is used, the weight ratio of the epoxy resin to the phenol resin is preferably in the range of 4:1 to 1:4, and more preferably in the range of 4:1 to 1:2.

The content of the resin(s) in the thermosetting conductive paste is preferably in the range of 2 to 40% by weight, and more preferably in the range of 5 to 30% by weight relative to the total weight of the conductive particles having a high melting point, the metal powder having a melting point of 300° C. or less and the resin(s), from the viewpoint of the printability and the electric conductivity of the electrode layer(s) obtained after curing.

The thermosetting conductive paste can be adjusted to have an appropriate viscosity by selecting the kind and amount of each of the conductive particles and the resin(s) and further, if necessary, by using a diluent, depending upon a method for printing or applying the thermosetting conductive paste on or to the ceramic composite body of a desired electronic part. For example, when the thermosetting conductive paste is used for screen printing, the apparent viscosity of the conductive paste at an ambient temperature is preferably in the range of 10 to 500 Pa·s, and more preferably in the range of 15 to 300 Pa·s. As the diluent, an organic solvent may be used. The organic solvent is selected depending upon the kind of the resin(s). The content of the organic solvent may be optionally selected depending upon the kinds of each of the conductive particles having a high melting point, the metal powder having a melting point of 300° C. or less and the resin(s) as used, and the component ratio thereof, as well as a method for printing or applying the conductive paste and the like.

As the organic solvent, aromatic hydrocarbons such as toluene, xylene, mesitylene and tetralin; ethers such as tetrahydrofuran; ketones such as methyl ethyl ketone, methyl isobutyl ketone, cyclohexanone and isophorone; lactones such as 2-pyrrolidone and 1-methyl-2-pyrrolidone; ether alcohols such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, and further a propylene glycol derivative corresponding thereto; esters corresponding thereto such as acetic ester; and diesters such as methyl ester or ethyl ester of a dicarboxylic acid such as malonic acid or succinic acid can be exemplified.

In addition to the above, if necessary, an aluminum chelate compound such as aluminum diisopropoxy(ethyl acetoacetato); a titanate such as isopropyl tri-isostearoyl titanate; an aliphatic polycarboxylic acid ester; an unsaturated fatty acid amine salt; a surfactant such as sorbitan monooleate; or a high molecular compound such as a polyester amine salt or polyamide; or the like as a dispersing agent may be mixed with the thermosetting conductive paste. Furthermore, an inorganic pigment, an organic pigment, a silane coupling agent, a leveling agent, a thixotropic agent, or an anti-foaming agent, or the like may be mixed therewith.

The thermosetting conductive paste can be prepared by homogeneously mixing ingredients by means of a mixing means such as a mixing and grinding machine, a marine propeller stirrer, a kneader, a roller or a pot mill. The thermosetting conductive paste, whose preparation temperature is not particularly limited to, can be prepared, for example, at an ambient temperature in the range of 20° C. to 30° C.

By using a thermosetting conductive paste thus obtained comprising conductive particles having a high melting point, metal powder having a melting point of 300° C. or less and a resin(s), a multilayer ceramic electronic part with an external electrode(s), of the present invention can be formed according to a publicly known method. For example, the thermosetting conductive paste can be directly printed or applied on or to a surface(s) where an internal electrode(s) of a ceramic composite body of a multilayer ceramic capacitor is led out, in any manner such as screen printing, transfer printing, or dip coating. Furthermore, if necessary, first of all, a fired copper electrode(s) may be formed on the surface(s) where an internal electrode(s) is led out, and then the present paste may be printed or applied thereon or thereto. Generally, the paste is printed or applied so that the thickness of the external electrode after curing can be preferably in the range of 1 to 300 µm, and more preferably in the range of 20 to 100 µm. When an organic solvent is used, the solvent is volatilized at an ambient temperature or by heating after printing or application.

Then the printed or applied paste is cured without especially putting it under an inert gas atmosphere so as to form the external electrode(s). The external electrode(s) formed from the thermosetting conductive paste according to the present invention can be formed by curing the paste at a relatively low temperature for a short period of time. However, in order to obtain satisfactory reliabilities for its mounting onto a substrate and/or its plating-treatment, it is preferred to cure the paste at a temperature of 80 to 400° C. for a period of 1 to 60 minutes so as to form the external electrode (s). For example, when the resin in the paste is epoxy resin with which phenol resin is used as a curing agent, the epoxy resin is cured at a temperature of 150 to 300° C. for a period of 1 to 60 minutes so as to obtain an external electrode(s).

That is, a multilayer ceramic electronic part of the present invention is obtained according to a method comprising the steps of: (1) providing a thermosetting conductive paste comprising conductive particles having a high melting point, metal powder having a melting point of 300° C. or less and a resin(s), and a ceramic composite body which is to be provided with an external electrode(s); (2) printing or applying said thermosetting conductive paste on or to a surface(s) where an internal electrode(s) of said ceramic composite body is led out; and (3) maintaining said ceramic composite body obtained in the step (2) to a temperature of 80° C. to 400° C. for a period of 1 to 60 minutes so as to form the external electrode(s). In this way, in parallel with curing at a relatively low temperature for a short period of time, the solid-phase diffusion of the conductive particles in the conductive paste (i.e. the external electrode(s)) into the metal of the internal electrode(s) can progress, the so-called state in which a diffused junction between the same or different metals is formed, thereby the multilayer ceramic electronic part is the one having excellent junction properties between the internal electrode and the external electrode.

Further, the term "a diffused junction" herein is to be understood to mean "a junction method or a junction state without fusing a matrix (that is, the conductive particles and the metal of an internal electrode(s)) itself".

A ceramic composite body of a multilayer ceramic electronic part, as used in the present invention, may be the one manufactured according to any publicly known method. Further, the term "a ceramic composite body" in the present invention means a fired product of a layered product wherein a ceramic layer(s) and an internal electrode layer(s) are alternately layered, or a layered product wherein a resin-ceramic hybrid material layer(s) and an internal electrode layer(s) are alternately layered. The ceramic layer(s) or the resin-ceramic hybrid material may be the one having properties suitable to the desired electronic part (for example, dielectric properties when the electronic part is a capacitor), as obtained by any publicly known method. Furthermore, the internal electrode layer is preferably the one wherein an inexpensive and accessible base metal such as Ni or Cu is used as an internal electrode, but is not limited to. The multilayer ceramic electronic part of the present invention may be, for example, a capacitor, a capacitor array, a thermistor, a varistor, an inductor, an LC composite part, a CR composite part, an LR composite part and an LCR composite part.

The surface(s) of the external electrode layer(s) of the resultant multilayer ceramic electronic part, if necessary, may be plated in order to enhance the adhesion strength when the electronic part is solder-mounted on a substrate or the like. The plating treatment is carried out according to a publicly known method, and in view of environmental considerations, it is preferred to apply Pb-free plating thereto. For example, a surface of an external electrode may be electroplated with nickel in a Watt bath or the like, and thereafter further may be electroplated with solder or tin.

The multilayer ceramic electronic part as thus obtained, wherein the external electrode layer(s) formed from the thermosetting conductive paste comprising the conductive particles having a high melting point, the metal powder having a melting point of 300° C. or less and the resin(s) is plated, is excellent in electric properties such as bonding-property between the internal electrode(s) and the external electrode(s), thereby it is suitable and useful for its mounting on a circuit board or the like.

EXAMPLES

The present invention will be hereinafter more particularly explained by means of the Examples and the Comparative Examples. The present invention is not intended to be limited by these Examples. Further, in these Examples and Comparative Examples the term "part(s)" indicates part(s) by weight.

[Preparation of Conductive Paste]

The composition of each of conductive pastes used in the Examples and the Comparative Examples is as shown in the following Table 1.

TABLE 1

| | Conductive Paste | | |
|---|---|---|---|
| | A (Fired-Type) | B (Thermosetting) | C (Thermosetting) |
| Spherical Silver Powder (A) | 50 | — | — |
| Spherical Silver Powder (B) | — | 75 | 55 |
| Scaly Silver Powder (C) | 25 | — | — |
| Scaly Silver Powder (D) | — | 10 | 15 |
| Barium-BoroSilicate Glass | 5 | — | — |
| Tin Powder | — | — | 15 |
| Ethyl Cellulose | 3.5 | — | — |
| Resol-Type Phenol Resin | — | 9.5 | 9.5 |
| Bisphenol A-Type Epoxy Resin | — | 5.5 | 5.5 |
| 2-ethyl-4-methylimodazole | — | 0.4 | 0.3 |
| Butyl Carbitol Acetate | 9.5 | — | — |
| Butyl Carbitol | — | 11.0 | 9.5 |

In Table 1, spherical silver powder (A) having an average particle size of 0.3 μm and a purity of 99.5% or more was used; as spherical silver powder (B) having an average particle size of 0.5 μm and a purity of 99.5% or more was used; scaly silver powder (C) having an average particle size of 12 μm and a purity of 99% or more was used; scaly silver powder (D) having an average particle size of 5 μm and a purity of 99% or more was used [each of the silver powders (A) to (D) mentioned above is manufactured by NAMICS CORPORATION]; and tin powder being spherical powder and having an average particle size of 4 μm and a purity of 99% or more was used. Besides, resol-type phenol resin having a number average molecular weight of 3,000 was used; and bisphenol A-type epoxy resin having a number average molecular weight of 900 was used.

Based upon the compositions as shown in Table 1, powder, a resin(s), an additive agent, a solvent and the like were mixed with each other, and kneaded by means of a roll mill till the mixture was homogeneous, and thereafter butyl carbitol was further added thereto as a solvent so as to adjust the viscosity of the paste to be 20 Pa·s/25° C.

[Preparation of Multilayer Ceramic Capacitor Samples]

Comparative Example 1

Comparative Capacitor: Preparation of Fired-Type Electrode

Each surface where internal electrodes of a chip-multilayer capacitor ceramic composite body (of 2125-type, with B-characteristics, a nickel internal electrode, a theoretical capacity of 100 nF) were led out was homogeneously dip-coated with a fired-type conductive paste (A) having a composition as shown in Table 1 so that the thickness after firing could be about 50 μm; and the coating was dried at 150° C. for 10 minutes; and then was fired by heating under the atmosphere in total of 60 minutes including a period of 10 minutes at 650° C., as well as a period for elevating to the temperature of 650° C. and a period for cooling down slowly to form external electrodes. Subsequently, the resultant external electrodes were plated with nickel in a Watt bath, and electroplated with tin to obtain a chip multilayer capacitor.

Comparative Example 2

Comparative Capacitor: Preparation of Thermosetting Electrode

Each surface where internal electrodes of a ceramic composite body of a chip multilayer capacitor as described above were led out was homogeneously dip-coated with a thermosetting conductive paste (B) as shown in Table 1 so that the thickness after curing could be 40 to 80 μm; and the coating was dried at 150° C. for 10 minutes; and thereafter was cured at 300° C. in a belt furnace under the atmosphere for 10 minutes to form external electrodes. Subsequently, the resultant external electrodes were plated with nickel in a Watt bath, and electroplated with tin to obtain a chip multilayer capacitor.

Example 1

Preparation of Thermosetting Electrode

A thermosetting conductive paste (C) as shown in Table 1 was applied, dried, cured and plated under conditions in Comparative Example 2 so as to obtain a chip multilayer capacitor.

[Measurement]

Each chip multilayer capacitor element obtained in the above was put on a Pb-free solder paste which had been printed on a copper-clad electrode of a glass-epoxy substrate. The capacitor element was solder-jointed with the substrate electrode at a temperature at which the solder paste was sufficiently fused, for example, at a temperature of 250 to 260° C. so as to be used as a test sample for the electric properties and the bonding strength. The initial electric properties (electric capacitance, tan δ) of the sample were determined by means of a 4278A manufactured by Agilent, and the bonding strength (shear strength) of the capacitor element to the substrate electrode was determined by means of a bonding strength-testing machine manufactured by AIKOH ENGINEERING CO., LTD. Thereafter, the electric properties and the bonding strength after a heat-cycle resistant test [at −55° C./125° C. (30 minutes/30 minutes); through 141, 265 and 545 cycles] were determined in a manner similar thereto. The results are shown in Table 2.

TABLE 2

|  | Comparative Example 1 | Comparative Example 2 | Example 1 |
|---|---|---|---|
| Electric Properties: Electric Capacitance (nF) | | | |
| In Initial Stage | 3 | 90 | 100 |
| After 141 cycles | 3 | 84 | 99 |
| After 265 cycles | 3 | 74 | 99 |
| After 545 cycles | 3 | 56 | 98 |
| Electric Properties: tanδ (%) | | | |
| In Initial Stage | — | 1.5 | 1.4 |
| After 141 cycles | — | 5.5 | 1.4 |
| After 265 cycles | — | 18.5 | 1.4 |
| After 545 cycles | — | 41 | 1.4 |
| Bonding Strength (N) | | | |
| In Initial Stage | 10 | 10 | 10 |
| After 141 cycles | 10 | 10 | 10 |
| After 265 cycles | 10 | 10 | 10 |
| After 545 cycles | 10 | 10 | 10 |

It has been shown that the electric properties of the capacitor obtained in Example 1 of the present invention was excellent as a capacitor, because the decrease of the electric capacitance was small at the initial stage and even after heat-cycles. On the other hand, the capacitor (comprising a fired-type plated electrode with a silver-containing prime-coating) obtained in Comparative Example 1 did not come in contact with the nickel-internal electrodes due to loose junction, thereby no electric properties could not be attained. Furthermore, as for the capacitor obtained in Comparative Example 2, which was obtained from the conventional thermosetting conductive paste, the electric capacitance was decreased to about 60% of the initial value after a heat-cycle resistant test (through 545 cycles), and the tan δ was increased to about thirty times the initial value, and thus the capacitor was poor in reliabilities.

Besides, a bonding surface between the internal electrode and the external electrode of the capacitor obtained in each of Comparative Example 2 and Example 1 was observed by means of an electron probe micro analysis (EPMA). As a result, in the bonding surface between the internal electrode and the external electrode of the capacitor obtained in Example 1, a metal-to-metal (conductive particles to the internal electrode) diffused junction was confirmed, while as for the capacitor obtained in Comparative Example 2, a metal-to-metal diffused junction was observed very little.

Examples 1a to 1d

In order to examine a case wherein each content of conductive particles having a high melting point and metal powder having a melting point of 300° C. or less in a thermosetting conductive paste is modified, a thermosetting conductive paste in a manner similar to the one described above was prepared with a composition as shown in the following Table 3. The total content of the conductive particles having a high melting point and the metal powder having a melting point of 300° C. or less in the thermosetting conductive paste was 60 to 98% by weight relative to the total weight of the conductive particles having a high melting point, the metal powder having a melting point of 300° C. or less and a resin(s). Furthermore, a capacitor sample was prepared with each of the prepared pastes in a manner similar to the one described in Example 1 so as to determine the electric properties and the bonding strength.

The capacitor obtained in each of Examples 1a to 1d was excellent in electric properties and bonding strength just like the one described in Example 1. In particular, when the total content (i.e. Ratio of Metal Powder to Paste in Table 3) of the conductive particles having a high melting point and the metal powder having a melting point of 300° C. or less was 70 to 95% by weight, the electric properties and the bonding strength were more preferable.

TABLE 3

| Composition | Example 1a | Example 1b | Example 1 | Example 1c | Example 1d |
|---|---|---|---|---|---|
| Spherical Silver Powder (B)* | 63.4 | 61.5 | 55 | 45.3 | 38.8 |
| Scaly Silver Powder (D)* | 17.3 | 16.8 | 15 | 12.4 | 10.6 |
| Tin Powder* | 17.3 | 16.8 | 15 | 12.4 | 10.6 |
| Resol-Type Phenol Resin* | 1.3 | 3.2 | 9.5 | 19.0 | 25.3 |
| Bisphenol A-Type Epoxy Resin* | 0.7 | 1.8 | 5.5 | 11.0 | 14.7 |
| 2-ethyl-4-methylimidazole | 0 | 0.1 | 0.3 | 0.6 | 0.8 |
| Ratio of Total Metal Powder (wt. %) to Paste (wt. %) | 98 | 95 | 85 | 70 | 60 |
| Electric Properties | | | | | |
| Electric Capacitance (nF) | 70 | 98 | 100 | 97 | 70 |
| tanδ (%) | 3.1 | 1.4 | 1.4 | 1.5 | 3.1 |
| Bonding Strength (N) | 5 | 8 | 10 | 10 | 10 |

NOTE:
*in the Table is synonymous with the one in Table 1.

Examples 1e to 1g

In order to examine a case wherein the content of metal powder having a melting point of 300° C. or less in a thermosetting conductive paste is modified, a thermosetting conductive paste was prepared with a composition as shown in the following Table 4 in a manner similar to the one described above. The content of the metal powder having a melting point of 300° C. or less in the paste was 1 to 25% by weight relative to the total weight of the conductive particles having a high melting point and the metal powder having a melting point of 300° C. or less. Furthermore, a capacitor sample was prepared with each of the prepared pastes in a manner similar to the one described in Example 1 so as to determine the electric properties and the bonding strength.

The capacitor obtained in each of Examples 1e to 1 g was excellent in electric properties and bonding strength just like the one described in Example 1. In particular, when the content (i.e. Ratio of Tin Powder to Total Metals Powder in Table 4) of the metal powder having a melting point of 300° C. or less was 5 to about 20% by weight, the electric properties and the bonding strength were more preferable.

TABLE 4

| Composition | Example 1e | Example 1f | Example 1 | Example 1g |
|---|---|---|---|---|
| Spherical Silver Powder (B)* | 66.1 | 63.4 | 55 | 50.1 |
| Scaly Silver Powder (D)* | 18.0 | 17.3 | 15 | 13.7 |
| Tin Powder* | 0.9 | 4.3 | 15 | 21.3 |
| Resol-Type Phenol Resin* | 9.5 | 9.5 | 9.5 | 9.5 |
| Bisphenol A-Type Epoxy Resin* | 5.5 | 5.5 | 5.5 | 5.5 |
| 2-ethyl-4-methylimidazole | 0.3 | 0.3 | 0.3 | 0.3 |
| Ratio of Tin Powder (wt. %) to Total Powdered Metals (wt. %) | 1 | 5 | 17.6 | 25 |
| Electric Properties | | | | |
| Electric Capacitance (nF) | 70 | 98 | 100 | 80 |
| tanδ (%) | 3.1 | 1.5 | 1.4 | 2.6 |
| Bonding Strength (N) | 5 | 10 | 10 | 10 |

NOTE:
*in the Table is synonymous with the one in Table 1.

Examples 2 to 9

In order to examine a case wherein each of conductive particles having a high melting point and/or metal powder having a melting point of 300° C. or less in a thermosetting conductive paste has been replaced with another different metal powder (having an average particle size of 4 to 6 μm), a thermosetting conductive paste was prepared with a composition as shown in the following Tables 5 and 6 in a manner similar to the one described above respectively. Then, a capacitor sample was prepared with each of the prepared pastes in a manner similar to the one described in Example 1 so as to determine the electric properties and the bonding strength. Each of the resultant capacitors was excellent in electric properties and bonding strength just like the one described in Example 1.

TABLE 5

| Composition | Example 2 | Example 3 | Example 4 |
|---|---|---|---|
| Spherical Silver Powder (B)* | 55 | 70 | 60 |
| Scaly Silver Powder (D)* | 15 | 10 | 15 |
| Metal Species having Melting Point of 300° C. or Less | Sn/Zn = 3/1 | In | Sn/Bi = 4/1 |
|  | 15 | 5 | 10 |
| Resol-Type Phenol Resin* | 6 | 10 | 10 |
| Bisphenol A-Type Epoxy Resin* | 9 | 5 | 5 |
| 2-ethyl-4-methylimidazole | 0.3 | 0.5 | 0.3 |
| Diethylene Glycol Monobutyl Ether | 10 | 10 | 10 |
| Electric Properties | | | |
| Electric Capacitance (nF) | 101 | 100 | 101 |
| Electric Properties tanδ (%) | 1.4 | 1.4 | 1.4 |
| Bonding Strength (N) | 10 | 10 | 10 |

NOTE:
*in the Table is synonymous with the one in Table 1.

TABLE 6

| Composition | Example 5 | Example 6 | Example 7 | Example 8 | Example 9 |
|---|---|---|---|---|---|
| Conductive Particles having High Melting Point | Ag/Cu = 3/1 | Ni | Ag/Zn = 3/1 | Al | Au |
|  | 55 | 55 | 55 | 55 | 55 |
| Scaly Silver Powder (D)* | 15 | 15 | 15 | 15 | 15 |
| Metal having Low Melting Point: Sn/Zn = 3/1 | 15 | 15 | 15 | 15 | 15 |
| Resol-Type Phenol Resin* | 6 | 6 | 6 | 6 | 6 |
| Bisphenol A-Type Epoxy Resin* | 9 | 9 | 9 | 9 | 9 |
| 2-ethyl-4-methylimidazole | 0.3 | 0.3 | 0.3 | 0.3 | 0.3 |
| Diethylene Glycol Monobutyl Ether | 10 | 10 | 10 | 10 | 10 |
| Electric Properties Electric Capacitance (nF) | 100 | 100 | 100 | 100 | 100 |
| Electric Properties tanδ (%) | 1.4 | 1.4 | 1.4 | 1.4 | 1.4 |
| Bonding Strength (N) | 10 | 10 | 10 | 10 | 10 |

NOTE:
*in the Table is synonymous with the one in Table 1.

Examples 10 to 16

A thermosetting conductive paste was prepared in a similar manner the one described in Example 1, except that the metal powder (i.e. tin powder) having a melting point of 300° C. or less in the thermosetting conductive paste (C) as employed in Example 1 was replaced with SnAg (9/1), SnCu (9/1), SnAl (9/1), SnPb (9/1), InAg (8/2), InZn (8/2) or BiPb (8/2) powder (having an average particle size of 4 to 6 μm). Then, a sample was prepared with each of the prepared pastes in a manner similar to the one in Example 1 so as to determine the electric properties and the bonding strength. Each of the resultant capacitors was excellent in electric properties and bonding strength. For example, the electric capacitance was in the range of 99 to 101 nF, and the tan δ was 1.4%, and the bonding strength was 10 N.

[Preparation of Multilayer Ceramic Thermistor Samples]

Comparative Example 3

A ceramic composite body of a chip multilayer thermistor wherein an Ag—Pd electrode was used as an internal electrode was made according to the procedures described in JPA-2000-357603. Both terminals (surfaces where the internal electrodes are led out) of the ceramic composite body in the form of a rectangular column of 3×3×5 mm were dip-coated with the fired-type conductive paste (A) used in Comparative Example 1 as described above so that the thickness of the paste (A) could be in the range of 40 to 80 μm after curing. The paste (A) was dried at 150° C. for 10 minutes, and fired at 600° C. for 10 minutes so as to form external electrodes. Thereafter, each surface of the resultant external electrodes was plated with nickel in a Watt bath, and then electroplated with tin so as to obtain the chip multilayer thermistor.

Comparative Example 4 and Example 17

Both terminals of a ceramic composite body of a chip multilayer thermistor as mentioned above were dip-coated with the thermosetting conductive pastes (B) or (C) used in Comparative Example 2 or Example 1 as described above so that the thickness of the paste could be in the range of 40 to 80 μm after curing. The paste (B) and (C) were dried at 150° C. for 10 minutes, and cured at 300° C. in a belt furnace under the atmosphere for 10 minutes so as to form external electrodes. Thereafter, each surface of the resultant external electrodes was plated with nickel in a Watt bath, and then electroplated with tin so as to obtain a chip multilayer thermistor.

[Measurement]

Each of the chip multilayer thermistor elements obtained in the above was put on a Pb-free solder paste which had been printed on a copper-clad electrode of a glass-epoxy substrate. The thermistor element was solder-jointed with the electrode at a temperature at which the solder paste was sufficiently fused, for example, at a temperature of 250 to 260° C. so as to be used as a test sample. The initial electric property (the value of resistance) in each of the samples was determined by means of a 4278A manufactured by Agilent. Thereafter, the value of resistance after a heat-cycle resistant test [at −55° C./125° C. (30 minutes/30 minutes); through 1,000 cycles] was determined in a manner similar thereto.

TABLE 7

|  | Comp. Example 3 | Comp. Example 4 | Example 17 |
|---|---|---|---|
| Conductive Paste | A (Fired-Type) | B (Thermosetting-Type) | C (Thermosetting-Type) |
| Electric Properties Value of Resistance (kΩ) |  |  |  |
| At Initial Stage | 5 | 6.5 | 5 |
| After 1,000 cycles | 6.3 | 9 | 5 |

It has been shown that the chip multilayer thermistor of the present invention obtained in Example 17 did not change in the value of resistance at all even after the heat-cycle resistant test and thus was excellent as a thermistor.

[Preparation of Multilayer Ceramic Varistor Samples]

Comparative Example 5

A ceramic composite body of a zinc-oxide system chip multilayer varistor wherein an Ag—Pd electrode was used as an internal electrode was made according to the procedures described in JPA-Hei 2(1990)-58807, JPA-Hei 8(1996)-97006 and the like. Both terminals of the ceramic composite body in the form of a rectangular column of 3×3×5 mm were dip-coated with the fired-type conductive paste (A) used in Comparative Example 1 as described above so that the thickness of the paste (A) could be in the range of 40 to 80 μm after curing. The paste (A) was dried at 150° C. for 10 minutes, and fired at 600° C. for 10 minutes so as to form external electrodes. Thereafter, each surface of the resultant external electrodes was plated with nickel in a Watt bath, and then electroplated with tin so as to obtain the chip multilayer varistor.

Comparative Example 6 and Example 18

Both terminals of a ceramic composite body of a chip multilayer varistor as mentioned above were dip-coated with the thermosetting conductive pastes (B) or (C) used in Comparative Example 2 or Example 1 as described above so that the thickness of the paste could be in the range of 40 to 80 μm after curing. The coated pastes were dried at 150° C. for 10 minutes, and cured at 300° C. in a belt furnace under the atmosphere for 10 minutes so as to form external electrodes. Thereafter, each surface of the resultant external electrodes was plated with nickel in a Watt bath, and then electroplated with tin so as to obtain a chip multilayer varistor.

[Measurement]

Each of the chip multilayer varistor elements obtained in the above was put on a Pb-free solder paste which had been printed on a copper-clad electrode of a glass-epoxy substrate. The varistor element was solder-jointed with the electrode at a temperature at which the solder paste was sufficiently fused, for example, at 250 to 260° C. so as to be used as a test sample. The initial electric property (a varistor voltage) of each of the samples was determined. Thereafter, the electric property (a varistor voltage) after applying a constant current under applied voltage in humidity (at 85° C., in 85 RH %) for a period of 1,000 hours was determined in a manner similar thereto. The number of crack occurrences was determined on observation by a 50-times optical microscope after the test with voltage applied in humidity.

TABLE 8

|  | Comp. Example 5 | Comp. Example 6 | Example 18 |
|---|---|---|---|
| Conductive Paste | A (Fired-Type) | B (Thermosetting-Type) | C (Thermosetting-Type) |
| Defective Number of Varistor | 15/100 | 5/100 | 0/100 |
| Number of Cracks | 8/100 | 0/100 | 0/100 |

It has been found that the chip multilayer varistor of the present invention obtained in Example 18 had a little change in the varistor voltage even after the test with voltage applied in humidity, had no crack occurrence in the element main-body, and thus was excellent as a varistor.

[Preparation of LCR Multilayer Part Samples]

Comparative Example 7

A ceramic composite body of an LCR multilayer chip wherein an Ag electrode was used as an internal electrode was made of a simulated chip layered with an LCR according to the procedures described in JPA-2002-314455, JPA-2002-208873, JPA-Hei 10(1998)-312934, JPA-Hei 6(1994)-232005 and the like. Both terminals of the ceramic composite body in the form of a rectangular column of 7×7×5 mm wherein a dielectric materials and sheets of ferrite were layered alternately were dip-coated with the fired-type conductive paste (A) used in Comparative Example 1 as described above so that the thickness of the paste (A) could be in the range of 40 to 80 μm after curing. The paste (A) was dried at 150° C. for 10 minutes, and fired at 600° C. for 10 minutes so as to form external electrodes. Thereafter, each surface of the resultant external electrodes was plated with nickel in a Watt bath, and then electroplated with tin so as to obtain the LCR multilayer part.

Comparative Example 8 and Example 19

Both terminals of a ceramic composite body of an LCR multilayer chip as mentioned above were dip-coated with the thermosetting conductive paste (B) or (C) used in Comparative Example 2 or Example 1 as described above so that the thickness of the paste could be in the range of 40 to 80 μm after curing. Each of the coated pastes was dried at 150° C. for 10 minutes, and cured at 300° C. in a belt furnace under the atmosphere for 10 minutes so as to form an external electrode. Thereafter, each surface of the resultant external electrodes was plated with nickel in a Watt bath, and then electroplated with tin so as to obtain the LCR multilayer part.

[Measurement]

Each of the LCR multilayer parts obtained in the above was solder-jointed with an FR4-substrate having a thickness of 0.8 mm at a temperature at which the solder paste was sufficiently fused, for example, at a temperature of 250 to 260° C. so as to carry out a heat-cycle resistant test [at −55° C./+125° C. (30 minutes/30 minutes); through 2,000 cycles]. The transmit and receive characteristics of an antenna before and after the heat-cycle resistant test were determined by means of an E5071A network-analyzer manufactured by Agilent. Then, when an insertion loss in the transmission end was 1.5 dB or more, or when an attenuation factor in the receiving end was less than 30 dB, such an LCR multilayer part was considered as a defective unit.

TABLE 9

|  | Comp. Example 7 | Comp. Example 8 | Example 19 |
| --- | --- | --- | --- |
| Conductive Paste | A (Fired-Type) | B (Thermosetting) | C (Thermosetting) |
| Heat-Cycle Resistant Test (through 2,000 Cycles) | 7/10 | 6/10 | 0/10 |

It has been found that each of the LCR multilayer parts of the present invention obtained in Example 19 had a little change in antenna characteristics even after the heat-resistant test, and thus was excellent as an LCR multilayer part.

An external electrode(s) of a multilayer ceramic electronic part of the present invention is formed from a thermosetting conductive paste which can be cured at a low temperature. Thus the multilayer ceramic electronic part does not have any defect due to high-temperature firing, which was found in a multilayer ceramic electronic part from a conventional fired-type conductive paste, and further can be obtained without using a nitrogen atmosphere at the time of firing. Besides, the multilayer ceramic electronic part of the present invention causes no deterioration of electric properties, differing from the one obtained from a conventional thermosetting conductive paste. Accordingly, a multilayer ceramic electronic part which is excellent in electric properties and suitable for the mounting on a substrate and for the plating-treatment is obtained.

What is claimed is:

1. A multilayer ceramic electronic part having
an external electrode(s) formed from a thermosetting conductive paste which is then cured, said thermosetting conductive paste comprising conductive particles of Ag having a high melting point of 400° C. or more, Sn metal powder having a melting point of 300° C. or less and a thermosetting resin(s), the thermosetting resin(s) being bisphenol-type epoxy resin and resol-type phenol resin in combination, and wherein the Sn metal powder is present in an amount by weight based on the total weight of said Ag conductive particles and said Sn metal powder, of from 5% to 17.6% and
an internal electrode(s) comprising Ni.

2. The multilayer ceramic electronic part according to claim 1, wherein the total content of said Ag conductive particles and said Sn metal powder having a melting point of 300° C. or less in said thermosetting conductive paste is in the range of 70 to 95% by weight relative to the total weight of said Ag conductive particles, said Sn metal powder, and said resin(s).

3. The multilayer ceramic electronic part according to claim 1 wherein the surface of the external electrode(s) is plated to enhance adhesive strength for solder mounting.

4. The multilayer ceramic electronic part according to claim 3 wherein the surface of the external electrode(s) is plated with nickel.

5. A multilayer ceramic electronic part obtained according to a method comprising the steps of:
(1) providing a thermosetting conductive paste comprising Ag conductive particles having a high melting point of 400° C. or more, Sn metal powder having a melting point of 300° C. or less and a thermosetting resin(s), the thermosetting resin(s) being bisphenol-type epoxy resin and resol-type phenol resin in combination, and a ceramic composite body, having an internal electrode(s) comprising Ni, which composite body is to be provided with an external electrode(s);
(2) printing or applying said thermosetting conductive paste on or to a surface(s) where an internal electrode(s) of said ceramic composite body is led out; and
(3) maintaining said ceramic composite body obtained in the step (2) at a temperature of 80° C. to 400° C. for a period of one to sixty minutes so as to cure said thermosetting conductive paste and form the external electrode(s); and wherein the Sn metal powder is present in an amount by weight based on the total weight of said Ag conductive particles and said Sn metal powder, of from 5% to 17.6%.

6. The multilayer ceramic electronic part according to claim 5, wherein said conductive particle in said external electrode(s) makes a diffused junction with the Ni of said internal electrode(s) of said multilayer ceramic composite body.

7. The multilayer ceramic electronic part according to claim 5, wherein said multilayer ceramic electronic part is selected from the group consisting of a capacitor, a capacitor array, a thermistor, a varistor, an LC composite part, a CR composite part, an LR composite part, and an LCR composite part.

8. The multilayer ceramic electronic part according to claim 5 wherein the surface of the external electrode(s) is plated to enhance adhesive strength for solder mounting.

9. The multilayer ceramic electronic part according to claim 8 wherein the surface of the external electrode(s) is plated with nickel.

* * * * *